Dec. 22, 1959

L. N. RIDENOUR 2,918,522

SUBSCRIPTION TELEVISION DISTRIBUTION SYSTEM

Filed Jan. 3, 1956

INVENTOR.
LOUIS N. RIDENOUR
BY
Lyon & Lyon
ATTORNEYS

Dec. 22, 1959   L. N. RIDENOUR   2,918,522
SUBSCRIPTION TELEVISION DISTRIBUTION SYSTEM
Filed Jan. 3, 1956   6 Sheets-Sheet 2

INVENTOR.
LOUIS N. RIDENOUR
BY
ATTORNEYS

Dec. 22, 1959 L. N. RIDENOUR 2,918,522
SUBSCRIPTION TELEVISION DISTRIBUTION SYSTEM
Filed Jan. 3, 1956 6 Sheets-Sheet 3

INVENTOR.
LOUIS N. RIDENOUR
BY
ATTORNEYS

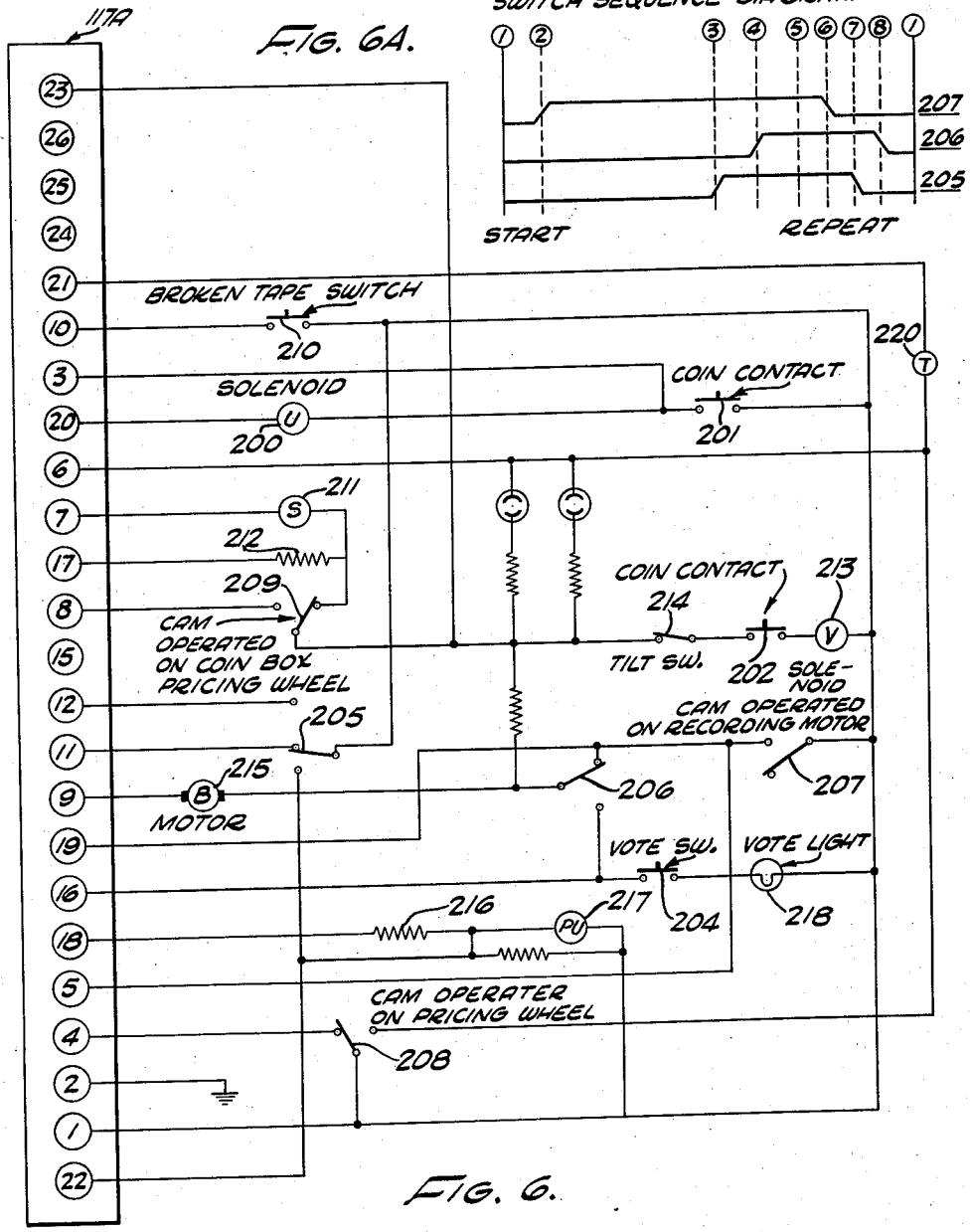

Dec. 22, 1959 L. N. RIDENOUR 2,918,522
SUBSCRIPTION TELEVISION DISTRIBUTION SYSTEM
Filed Jan. 3, 1956 6 Sheets-Sheet 6
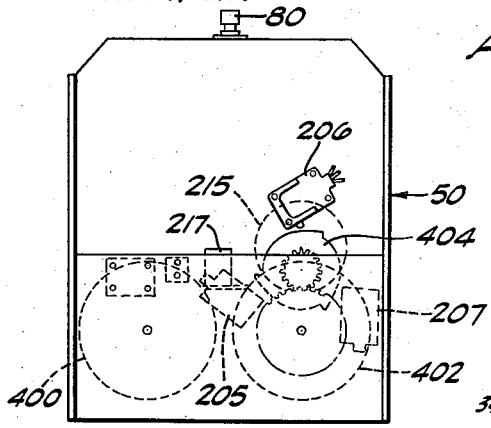
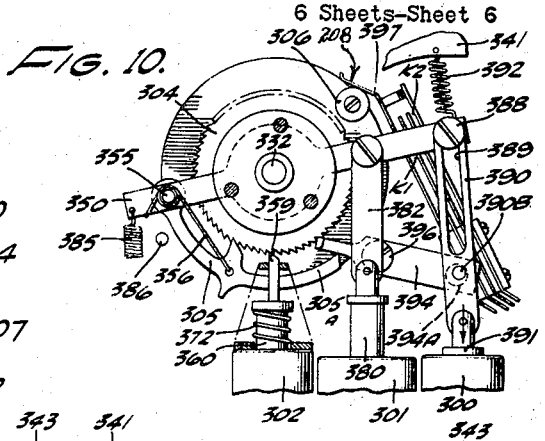
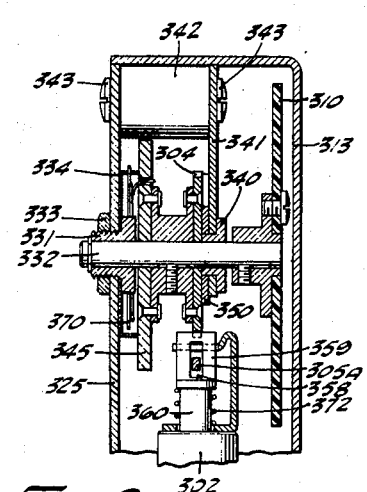
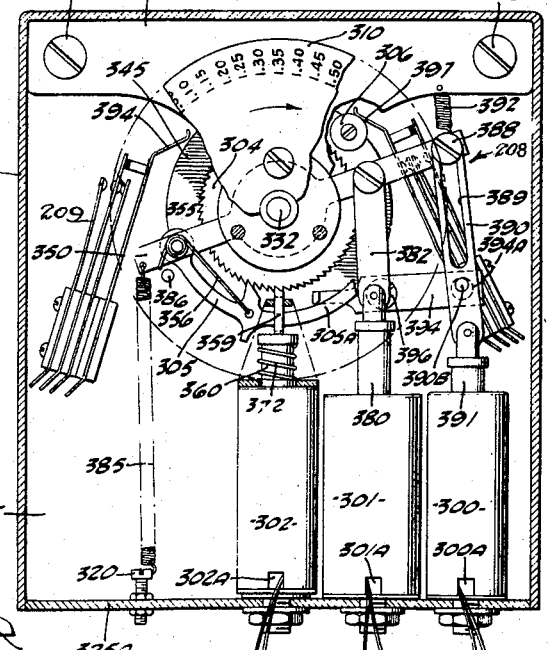
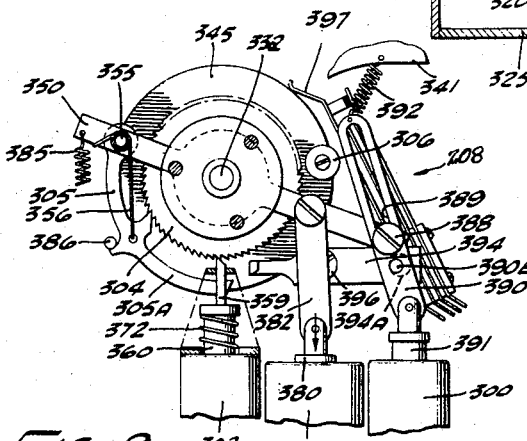
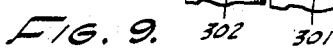
INVENTOR.
LOUIS N. RIDENOUR
BY
ATTORNEYS

United States Patent Office 2,918,522
Patented Dec. 22, 1959

2,918,522

SUBSCRIPTION TELEVISION DISTRIBUTION SYSTEM

Louis N. Ridenour, Los Angeles, Calif., assignor, by mesne assignments, to Paramount Pictures Corporation, New York, N.Y., a corporation of New York Application January 3, 1956, Serial No. 556,917

16 Claims. (Cl. 178—5.1)

This invention relates to an improved community subscription television system and, more particularly, to an improved method and means for scrambling program signals transmitted from a central studio to the receiver of a subscriber over a closed circuit and for unscrambling those signals upon the acknowledgment and satisfaction of a charge for said program signals.

The cost of television programs is a factor which assumes considerable proportions when a quality program is sought to be performed. This cost factor has resulted in fewer and fewer quality programs being made available to the public. In order to assist in meeting the costs of quality programs, the proposal has been made that the public contribute to the costs of such programs in a manner similar to the payment of an admission fee to any theater performance. The system developed to secure such an arrangement has been broadly termed a system for subscription television. A number of different arrangements for subscription television have been proposed.

The arrangement to which this application is directed is the one wherein apparatus including a coin box is located at the receiver of a subscriber. Programs from the central transmitter for which a charge is to be made may be preceded as well as accompanied by signals which operate apparatus in both the receiver and coin box to establish a coin demand representative of the cost for viewing the program to be transmitted and which prevents an intelligible picture from being received and the program sound from being heard. A subscriber who wishes to see and hear this program deposits sufficient coinage in the box to satisfy the demand. This results in the operation of apparatus which permits the program sound to be heard and the display of the program picture in a normal and unaffected manner.

In an application for a community subscription television system entitled Subscription Television with Scrambled Transmission and Marquee and Barker, by Robert E. Gottfried, Allen D. Hoffmann, and Louis N. Ridenour, filed December 3, 1951, Serial No. 259,636, which is assigned to this assignee, a community television system is described in which the distribution of both free and paid programs occurs from a central transmitter which is connected to the subscribers by wire.

Heretofore, in systems of this sort, it has been customary to scramble a program at the central transmitter. The scrambled program is received at the subscriber's television set, and, if the coin demand is satisfied, apparatus is actuated to unscramble the program. Thus, a scrambler is required at the television studio and an unscrambler is required at each one of the subscriber's television sets. In the above-noted application there is described mechanism whereby the scrambling apparatus is no longer required at the transmitter; however, at the receiver a filter is inserted in the incoming line. This filter prevents a program for which payment is required from being received. Upon the proper payment, however, apparatus is actuated to short out or shunt the filter, thus permitting the receiver to receive the program.

An object of this invention is to provide a system of the type described in which there are improved means at a subscriber's receiver for scrambling a program for which payment has not been made. It will be appreciated that the system previously described does not scramble the program but prevents it from being received.

A further object of the present invention is to provide improved scrambling and unscrambling means at a subscriber's receiver which is simpler and more economical than the previously described systems.

Still a further object of the present invention is the provision of a community subscription television system wherein free programs can be viewed and programs for which payment is to be made cannot be viewed until the required payment has been made.

These and other features of the invention are obtained in a community television subscription system wherein programs are transmitted from a central studio via coaxial cable to the receivers located in the homes of the various subscribers. If a charge is to be made for a program, then preceding and also accompanying that program are signals which establish the amount of payment required for the program at a coin box located at each receiver of each subscriber. These signals also operate circuitry which serves to spoil the picture being transmitted at the receiver and which also serves to prevent the sound accompanying that picture from being heard. The sound that is permitted to be heard at this time is a description of the program, its price, its time or times of showing, and other desired information. This sound is termed the "barker." Satisfaction of the coin demand by depositing the required amount of coinage in the coin box serves to operate circuitry to render intelligible the program picture and to permit the program sound to be heard.

Picture scrambling is achieved in one embodiment by keying picture signals at a supersonic frequency. When the required payment is made, then the program is directed through a different circuit and is received clear of the keying signals. It can thus be viewed by the subscriber.

In another embodiment of the invention, picture scrambling is achieved by inserting in the subscriber's receiver a means for preventing sync signals from reaching the deflection coils of the television tube. This effectively scrambles the received picture so that it is unintelligible. Upon payment of the required coinage, the circuit which prevents the sync signals from being applied to the deflection coils of the cathode-ray tube in the receiver is inactivated and the picture is rendered intelligible.

The features of the present invention which are believed to be novel are set forth with particularity in the appended claims. The invention, itself, both as to its organization and manner of operation, together with further objects and advantages thereof, may best be understood by reference to the following description taken in connection with the accompanying drawings in which:

Figure 3 is also a schematic diagram of another embodiment of the invention showing the required apparatus at a subscriber's receiver;

Figure 6 is a circuit diagram of the coin box apparatus required to operate with the apparatus shown schematically in Figure 5;

Figure 6A is a diagram showing sequence operation of switches from a cam on a tape-drive motor in the coin box;

Figure 7 shows the mechanism of a coin box in plan view;

Figures 8, 9, and 10 are views showing details of the coin box; and

Figure 11 is a rear view of the coin box showing the disposition of the tape recorder and its associated switches.

Figure 1:
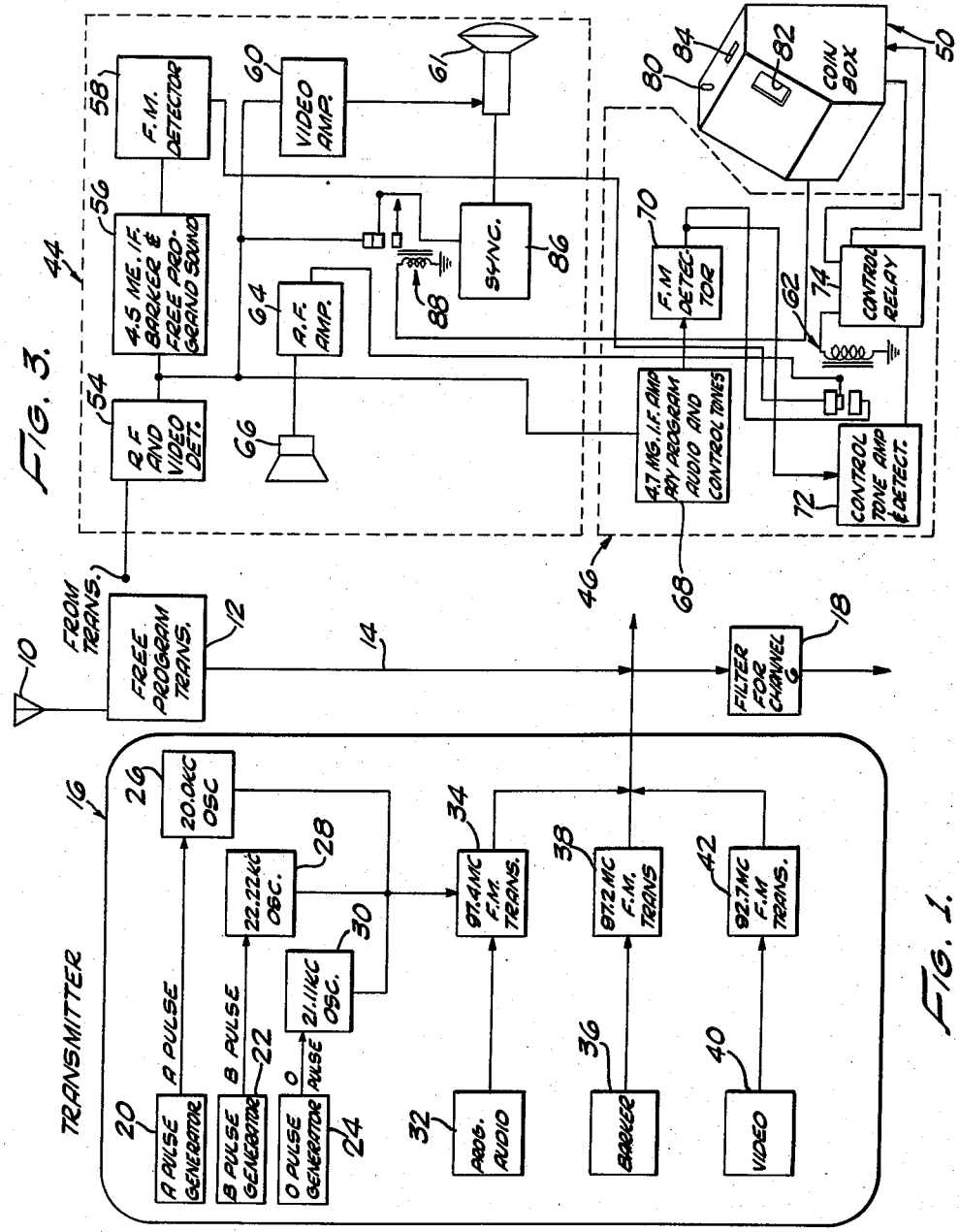
Figure 1 is a schematic diagram of a community television system transmitter required to operate with the embodiments of the invention.

Referring now to Figure 1, a schematic of a television transmitter of the type required herein may be seen. A strategically placed antenna 10 receives programs which are not receivable by the usual antenna installation and applies them to a free program transmitter 12 which can be some form of amplifying apparatus. The free program transmitter is connected by wire 14 to all the individuals who subscribe to the community antenna service. For example, Palm Springs, California, is in a valley at the foot of a mountain which prevents programs being transmitted from Los Angeles, from being received. The antenna is positioned on the top of the mountain and the signals it receives from Los Angeles are amplified, brought down to the valley using a coaxial cable, amplified again, and then distributed by coaxial cable to the various homes in the community. Subscription television programs are usually transmitted from a transmitter 16 located within the community. This transmitter is connected to the same wire distributing network which is used for the free program distribution to the various television sets. To prevent interference with free programs, the local subscription television transmitter uses a transmitting channel which is not being used by the transmitters at the distant city. In the case of the example cited, channel 6 is not being used in Los Angeles, so that in Palm Springs the local transmitter sends signals to the various subscribers by means of the carrier frequency allocated to channel 6. In order to prevent signals from the local transmitter being received by individuals who are not subscribers to the paid programs, filters 18 are inserted in the incoming line which pass the frequencies of all channels except channel 6.

The local transmitter 16 includes three generators 20, 22, 24 which generate repetitive pulse trains which can be designated as A pulses, B pulses, and O pulses. The number of pulses in a train and the time of generation may be controlled. These pulses are used to key, respectively, a 20 kc. oscillator 26, a 22.22 kc. oscillator 28, and a 21.11 kc. oscillator 30. The three keyed oscillations are combined and are modulated on the same carrier as the carrier on which the program audio signals are being transmitted. The program audio signals are the signals which accompany the program for which payment is required, and these signals are obtained by the usual apparatus designated as program audio 32. Thus, program audio 32 and the keying oscillations are modulated and transmitted by a 97.4 mc.-FM transmitter 34. Also being transmitted on a carrier of 97.2 megacycles is an audio signal known as a barker. The barker, as previously stated, consists of announcements of the type of entertainment, the price, and the different times at which such transmission occurs. This is generated by the usual audio apparatus designated here as a rectangle 36, and it is transmitted by a 97.2 mc.-FM transmitter 38. The video portion of the program is also generated at the television studio by the usual camera and video sync apparatus designated here by a rectangle 40. The video and sync signals are transmitted at 92.7 mc. by an AM transmitter 42. The three carriers are then combined and applied to the distributing land lines which go to the various subscribers' television sets. It should be noted that there is no scrambling apparatus of any sort at the local transmitter. The video and audio portions of the program are generated and transmitted using standard, commercially available equipment.

Usually transmitted sometime in advance of, as well as along with, the video and audio portions of a program for which a charge is to be made are the price and program identification signals in the form of A, B, and O pulses. Also, the barker is transmitted before the program. The barker and the price and program identification signals are also transmitted along with the program, since, in a number of such programs such as sporting events and the like, it may be desired to tune in to the program, even though it has already started. However, in order to give a subscriber an opportunity to arrange to see the complete program, the control signals and barker are transmitted first.

Figure 4:
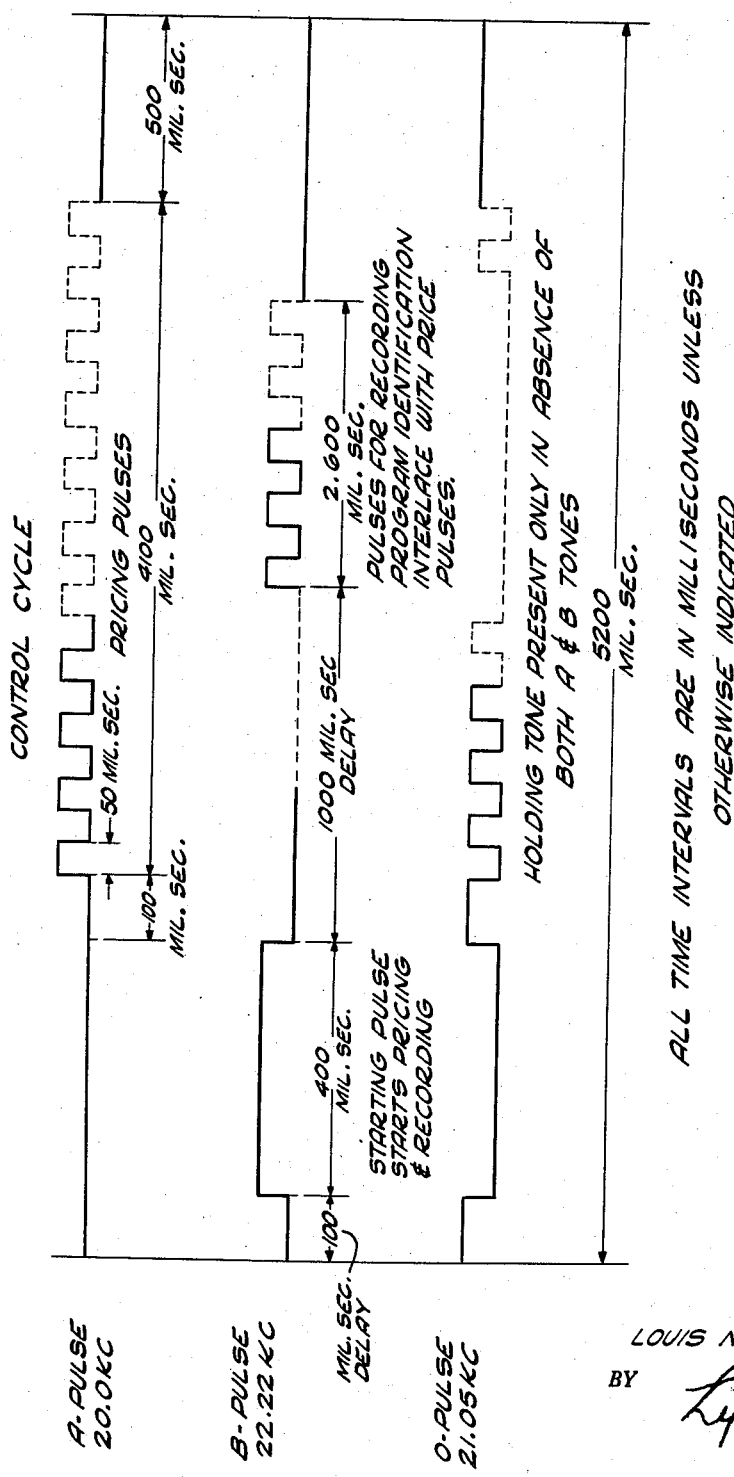
Figure 4 is a wave shape diagram of the control pulses which are emitted from the transmitter during a control cycle to establish (1) a coin demand, (2) information for program identification, and (3) operation of the apparatus at a subscriber's receiver.

Let us assume that it is desired to transmit a program for which payment is required. The generator of the A pulses generates pulses in a train such as shown in Figure 4. The A pulses are 50 millisecond pulses and are spaced 50 milliseconds. They are termed the pricing pulses and the number in a pulse train is determined in accordance with the desired price to be charged. The B pulse generator, after a 100 millisecond delay, generates a starting pulse which has a duration of 400 milliseconds. There is then a 1000 millisecond delay, and then a group of 50 millisecond pulses are generated which interlace with any of the pricing pulses which occur while these B pulses are occurring. These B pulses serve to initiate operations in a subscriber receiver and also provide program identification information. The O pulse generator produces pulses which are supposed to interlace with any blanks or intervals unaccounted for by the interlaced A and B pulses. Figure 4 is a wave shape diagram of a complete cycle of these A, B, and O control tones. They may be generated using perforated tape and photocell pickup tubes in a manner such as is described in an application by Gottfried et al., for Pulse Responsive Control Apparatus, filed May 10, 1951, Serial Number 225,653, and assigned to this assignee.

Keying, using the control tones, and modulation of the keyed frequencies on the 97.4 megacycle carrier may also be carried out in the manner described in the Gottfried et al. application. However, there are other means than the one cited which are well known in the art to generate the tones, to use them to key the respective frequencies, and then to modulate them on the carrier.

Figure 2:
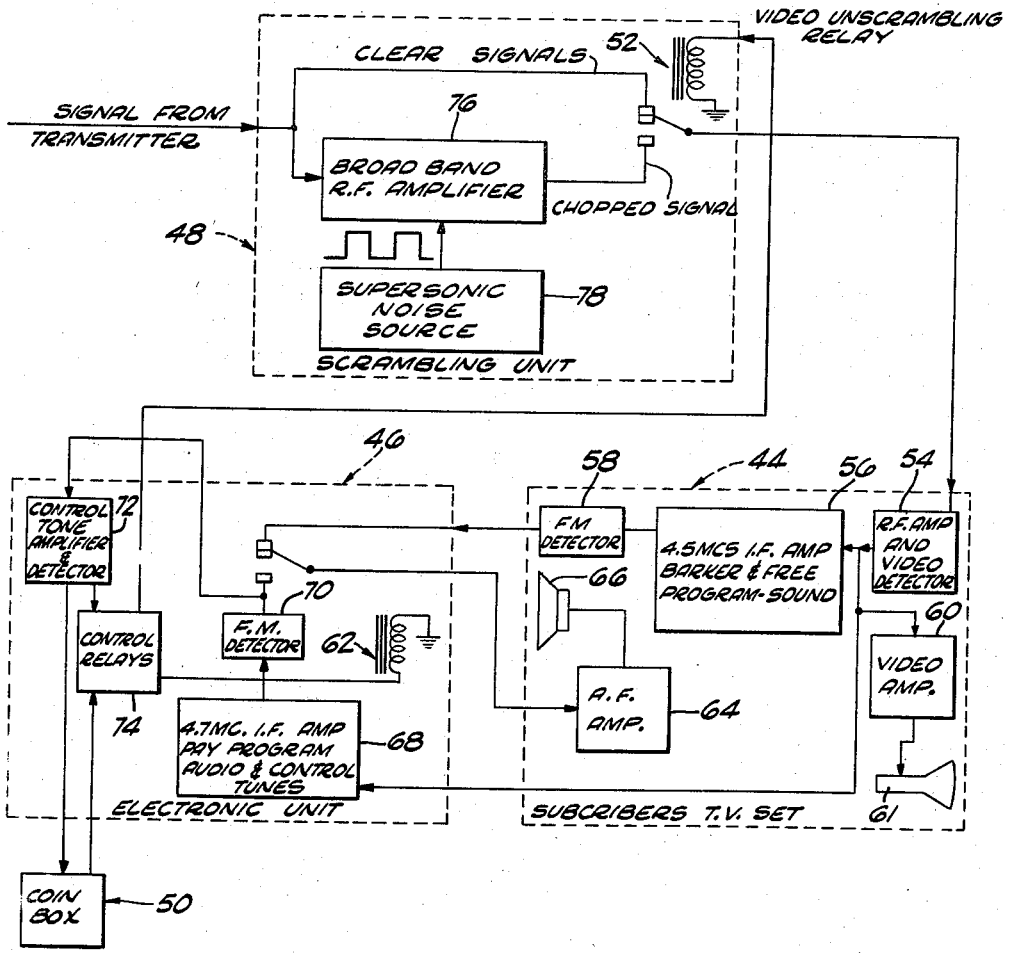
Figure 2 is a schematic diagram of one embodiment of the invention showing the apparatus required at a subscriber's receiver.

The control tone information as well as the barker go out over the distribution lines to a subscriber's receiver 44 such as is shown included in dotted lines in Figure 2. At each receiver there are located devices which for identification are called an electronic unit 46, a scrambling unit 48 which can be included in the electronic unit, and a coin box 50.

Signals sent from the community antenna or free programs transmitted from the local transmitter will pass through the line designated as the clear signal line and through the normally closed contacts of a video unscrambling relay 52 which are closed when the relay is not excited. The output from the normally closed relay contacts is applied to the subscriber's television set 44 which includes the usual RF and video detector 54, 4½ megacycle sound IF 56, and FM detector 58. The video signals are detected in the usual manner and applied to the cathode-ray tube via a video amplifier 60, where the picture is displayed in the usual manner. Not shown are the remaining required circuits, such as the sync circuits, since they are of no concern in this embodiment of the invention. The audio signals pass from the detector 58 and out of the television set through the normally closed contacts of an audio relay 62 in the electronic unit 46. From these contacts the audio signals are returned to the audio-frequency amplifier 64 in the television set and then to the loud speaker 66. Thus, programs for which no payment is to be made are received, heard, and displayed in an unaltered fashion.

When a program for which payment is required is transmitted, it is preceded and accompanied as well by the previously described control signals and a barker. These control signals will pass through the clear signal line and through the normally closed contacts of the video unscrambling relay 52 to the RF and video detector 54 in the subscriber's television set. The output is connected to a 4.7 megacycle IF 68 which is in the electronic unit 46. This has its output connected to an FM detector 70. The 4.7 megacycle IF will pass the program audio and control tones which are not passed by the IF stages of the television receiver. The control tones are applied from the detector 70 to a control-tone amplifier and detector 72 which serves to operate control relays 74 which, in turn, cause the video unscrambling relay 52 to be operated. When the video unscrambling relay is operated, the signals being received, instead of passing through the clear signal line to the television receiver, pass through a broad-band amplifier 76, then through the now closed, normally open video relay contacts to the subscriber's television set.

A square-wave generator or a noise source 78 is provided which oscillates at some supersonic frequency. This noise source is connected to the grid of one of the stages in the broad band amplifier so that any signal passing therethrough is keyed at a supersonic frequency. The chopped signal passes through the now closed relay contacts to the television receiver.

The supersonic noise source 78 serves to chop video signals to such an extent that the picture presented on the cathode-ray tube 61 is unintelligible. However, the audio portions of a transmission, as well as the control tones, are not affected since the interruption afforded by the noise source is at a supersonic frequency and will not pass through the audio sections of the electronic unit and the television set. Therefore, the barker will be heard through the loud speaker and will inform the subscriber of the price of the program, as well as the type of entertainment to be provided.

The control tones from the control-tone amplifier detector will operate relays in the coin box 50 to set up the price demanded to view a program. The coin box 50 may be of the type having the general outline shown in Figure 3. A voting button 80 is shown at the top of the coin box. An indicating window 82 through which the price established may be seen is shown on the side. A slot 84 through which coins may be inserted through the box is on top of the coin box.

When the required price is established in the coin box, the subscriber is then permitted to insert the amount of coinage indicated. As soon as the coin demand is satisfied by the deposited coinage, the coin box operates to permit the control relays 74 to excite the audio relay 62 and to de-energize the video unscrambling relay 52. Excitation of the audio relay serves to permit the program sound to be connected into the audio frequency amplifier of the subscriber's television set. The video unscrambling relay when de-energized, of course, permits clear signals to be received, and thus the video signal seen is of the quality required for a good picture and the accompanying program sound is heard.

In summary, therefore, in advance of a program for which payment is to be demanded control tones and barker sound are transmitted. This establishes a coin demand in the coin box at the subscriber receiver and operates a video scrambling relay, so that unless the coin demand has been met the subsequently transmitted program cannot be seen intelligibly or heard. If satisfactory payment is made, then the video scrambling relay is inactivated, an audio relay is actuated, and the program can be both seen and heard.

Figure 3 shows another embodiment of the invention. The coin box 50 and the electronic unit 46 as well as the television set of the subscriber 44 are substantially as shown in Figure 2. Similar functioning parts have similar reference numbers. However, in this instance, the signal from the transmitter is applied directly to the subscriber's receiver 44, there being no intervening noise source. When a free program is being received, the set operates in the usual fashion to present both sound and picture. The output of the set FM detector 58 passes through the normally closed contacts of the audio relay 62 in the electronic unit and thence back to the audio system of the set. Also shown in the set is a rectangle 86 representative of the sync circuits and a sync relay 88. When a program for which payment is required is transmitted, the barker sound is heard via the set IF circuits 56 and audio amplifier 64 as before. The control tones are applied to the 4.7 megacycle IF circuit 68, detector 70, and then separated from any program sound signals by the control-tone amplifier and detector 72. They are then applied to the control relays 74 which operate to establish a coin demand in the coin box. Upon establishment of a coin demand in the coin box, the sync relay 88 is operated so that its normally closed contacts are opened, and this operates to either prevent sync signals from being generated or from being applied to the deflection circuits of the set (not shown). Thus, any program picture will be effectively scrambled with the set in this condition. Barker sound will be heard, however. When coin demand is satisfied by depositing the proper coinage, the sync signal interruption circuit or sync relay is inactivated by the coin box mechanism and the audio relay 62 connecting the set IF to the audio circuit is operated to connect the output of the detector 70 to the television set audio circuit. This stops the barker sound and permits the program sound to be heard. Thus with this embodiment of the invention, until payment for a program has been made, a picture is effectively scrambled and only barker sound is heard. Payment of the coin demand permits presentation of an intelligible picture and the program sound.

Figure 5:
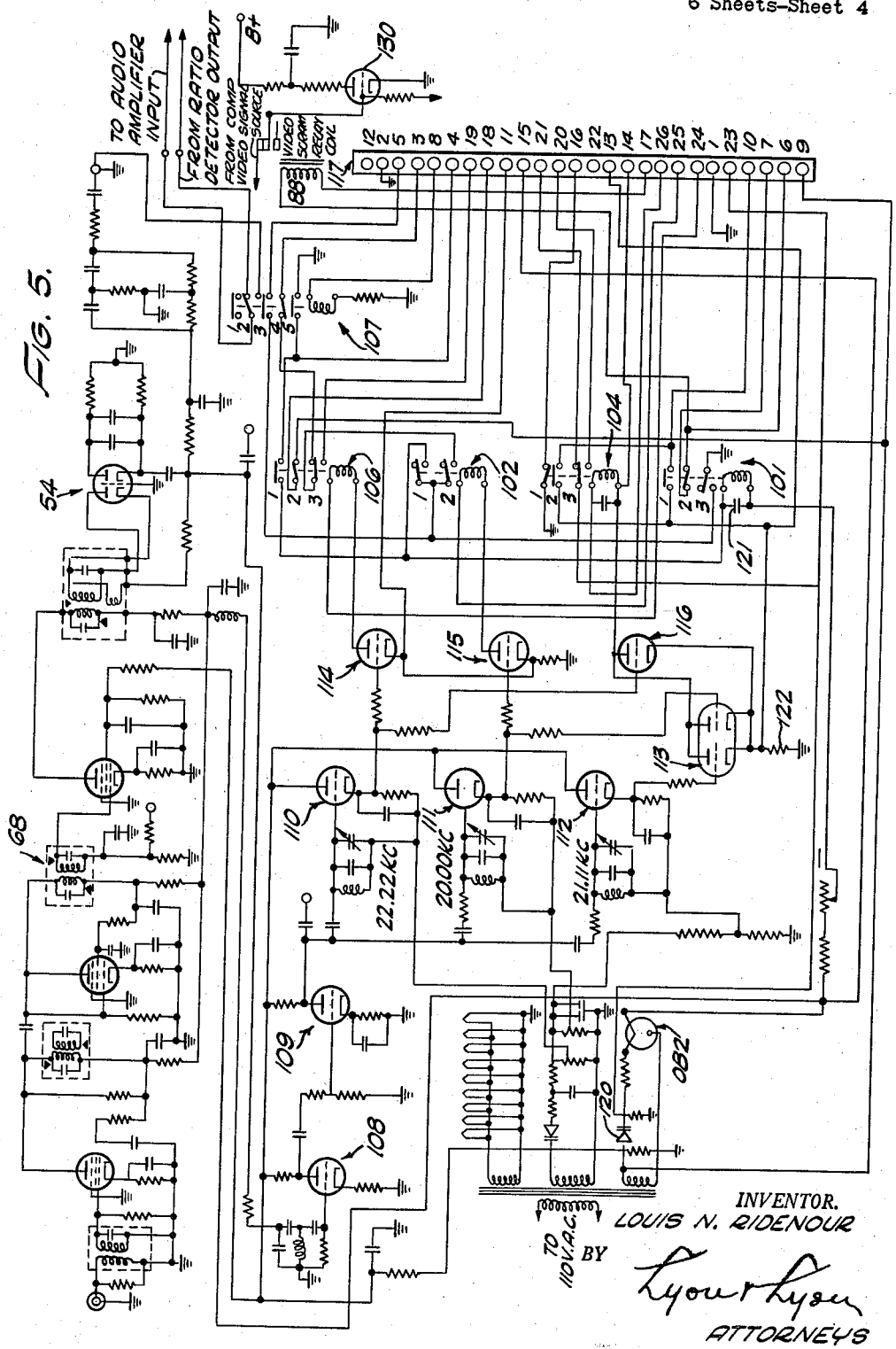
Figure 5 is a circuit diagram of the apparatus required in the electronic unit at a subscriber's receiver.

Reference is now made to Figure 5 wherein there is shown a circuit diagram of the apparatus in the electronic unit which is at each subscriber's receiver. Also shown are the modifications required at a subscriber's receiver in order to make it conform to the subscription television system. The embodiment shown in Figure 5 is an electronic unit which can be used in the embodiments used in the invention shown in either Figures 2 or 3. However, it will be described in connection with the embodiment of the invention shown in Figure 3, which is the preferred embodiment of the invention.

Figure 6 shows the apparatus contained in the coin box. In the description which follows, Figures 5 and 6 will be considered together, interconnections being made between the electronic unit and the coin box unit by means of a plug and jack. The identification numbers in the plug shown in Figure 5 have corresponding numbers in the jack shown in Figure 6, whereby the means of interconnection between the circuits shown in the two figures will be readily apparent.

Referring now to Figure 5, there is shown a conventional three-stage 4.7 mc.-IF 68 followed by an audio detector. The IF has a 4.7 megacycle band-width. Accordingly, the signals which pass through it will be the control tone signals and the pay-program sound. These are applied to the detecting circuit 54 including the usual ratio detector circuitry and emphasis networks. The output of the detector is coupled (1) to the third contact of a relay 107 and (2) to a tuned amplifier 108. The tuned amplifier 108 is tuned to reject the program sound frequencies and to pass the control tone frequencies. This is followed by a second amplifier 109. The output of the second amplifier 109 is applied, in turn, to three tuned amplifier circuits 110, 111, 112. The first circuit 110 is tuned to pass only 22.22 kc. and thereby the B control tones are passed; the second circuit 111 is tuned to pass 20.0 kc. and thereby pass the A control tones; and the third circuit 112 is tuned to pass 21.11 kc. and thereby pass the O control tones. At this point it should be noted that these frequencies are chosen by way of example and were actually employed in an operative embodiment. This, however, is not to be taken as a limitation upon the invention herein. Outputs are taken from the respective tuned amplifier cathodes. These outputs consist of the B control tones, the A control tones, and the O control tones which have been separated from the program sound.

*Establishing the price of a program.*—The first operation performed by these control tones is to establish the price of the program. The output of the tuned amplifier 110 for the B control tones is amplified by an amplifier 114 applied to relay 106 which has its winding in series with the anode of the amplifier. As shown in Figure 4, the B wave train begins with a 400 millisecond pulse. This causes the relay 106 to close for 400 milliseconds. Contact 1 on relay 106 connects one end of the coil of a relay 101 through pin 4 of the plug and jack 117, 117A to switch 208 in the coin box (Figure 6) and back through pin 1 of the plug and jack to ground. Therefore, one end of the coil of relay 101 is grounded. The other end of this relay coil is connected to a half-wave rectifier 120 so that, when relay 106 closes, relay 101 is energized. The condenser 121 which is connected across the coil of relay 101 prevents it from responding to any short pulse or rapid operation of relay 106, since the time constant provided by the condenser and coil is such that relay 101 operates only on long pulses such as the 400 millisecond pulse. Once relay 101 operates, it will remain operated as long as program pulses are received. This is because relay 101 has a time constant such that it will not lift during the 50 milliseconds between the program pulses. Furthermore, relay 101 is energized through a contact 1 of a relay 102; thus, as shown later, either pricing pulses or program identification pulses (A or B) serve to maintain relay 101 operated. Relay 101 can thus be termed a holding relay.

The A pulses or pricing pulses are applied from the cathode of the second tuned circuit 111 to the grid of an amplifier 115 and cause it to conduct, whereby the current pulses flowing through the tube also actuate a relay 102 which has its coil in series with the plate circuit of the tube. The now closed contacts 1 of relay 102 also serve to connect the relay 101 coil to ground through the now closed contacts 3 of relay 101. Contacts 2 of relay 102, which are also connected to ground via now closed contacts 3 of relay 101 connect this ground through normally closed contacts 3 of relay 106 and through normally closed contacts 4 of a relay 107 and from there to pin 3 of the plug and jack 117 and 117A and thence to one side of a pricing solenoid 200. Therefore, whenever relay 102 closes and relays 106 and 107 are not operated, one side of the pricing solenoid 200 is grounded. It is noteworthy that when pricing pulses commence the 400 millisecond B pulse has terminated and no further B pulses occur for 1000 milliseconds. The interlace between A and B pulses permits relay 106 to be open whenever a pricing pulse occurs. Relay 102 is closed by each one of the pricing pulses, and, accordingly, may be said to be operated as many times as there are pricing pulses. The other side of the pricing solenoid goes to pin 20 of the plug and jack to contacts 3 of relay 104 and from there to a potential source of 150 volts supplied by rectifier 120. Thus, as long as relay 104 is operated and the previous conditions occur, the pricing solenoid will be actuated by pricing pulses, thereby establishing the price of the program.

Relay 104 has its coil connected between the plate of an amplifier tube 116 and a source of B+. Accordingly, whenever this tube is operated, relay 104 will be closed. This amplifier tube receives B tones which are applied to its control grid from the cathode of the first tuned amplifier stage 110. The cathode of this amplifier is connected in common with the cathode of a double triode 113 which has a common cathode load resistor. The plate of the amplifier 116 is connected to a common plate connection of the double triode 113. This double triode 113 has one control grid connected to the cathode of the third tuned amplifier 112 and the second control grid connected to the cathode of the second tuned amplifier 111. Thus, current is always drawn through one section or the other of the double triode by the presence of the O tones or the A tones. This insures that whenever either the A, B, or O tones occur current is drawn through the amplifier stage in series with the coil of relay 104 and thus, also, through the relay coil.

Initially the double triode 113 and the following amplifier 116 are cut off by a high-value resistor 122 on the order of 100K in series with the cathode of these tubes. However, when relay 101 is operated, its contacts 1 close to connect these three cathodes to ground, thereby shunting the 100K resistor. This may be seen by following contacts 1 from relay 101 through pin 10 of the plug and jack through a broken-tape switch 210 in Figure 6 and back through pin 1 of the plug and jack to ground. Once relay 104 is operated, it closes its contacts 2 which shunt contacts 1 on relay 101. Since relay 104 is the holding relay and is maintained operated as long as any pulses are received, the cathode resistor 122 remains bypassed regardless of any opening subsequently by relay 101. Any interruption of the control tones will open relay 104 and thus prevent subsequent operation of the apparatus. The cycle of operation must commence again with the receipt of the starting pulse of 400 milliseconds in the B control tones.

As soon as the first pricing pulse is received, it operates on the price-setting solenoid 200 to turn a pricing wheel in the coin box 50 (shown in detail in Figure 7) from a blank position. This serves to operate the cam-operated switch 208 in the coin box so that pin 4 of the jack is ungrounded. This serves to interrupt the path from the coil of relay 101 through contacts 1 of relay 106 through pin 4 of the plug and jack through switch 208 to ground. As a result, relay 101 will open. However, in view of the time constant provided by the condenser 121 connected across the coil, it will not open until the pricing pulses cease. Once relay 101 opens, with switch 208 operated, the long B pulse will not close relay 101 again. This, accordingly, functions to prevent starting a pricing cycle again, once the price of a program has been entered into the coin box.

In being operated, switch 208 serves to connect pin 6 of the jack 117A to ground. This closes two circuits. The first is closed through normally closed contacts 2 of relay 101 back through pin 7 of the plug and jack through a coin slot solenoid 211 (a solenoid which serves to prevent coins being deposited until operated), through another switch 209 which is cam operated by the coin box pricing wheel (shown in Figure 7), and then through pin 23 of the plug and jack to the unregulated voltage supply. This serves to operate the coin slot solenoid 211, designated as S, to open a door under the coin slot 84 in the coin box shown in Figure 3, so that coins may be deposited after a pricing cycle is over. The second circuit which is closed by operated switch 208 extends through pin 6 of the plug and jack through the video scrambling relay 88 shown in Figure 5, back through pin 17 in the plug and jack through a limiting resistor 212, then down through the switch 209 through pin 23 of the plug and jack to the power supply. Thus, the video scrambling relay is operated when switch 208 is operated by a price being established, and this causes any picture presented on the cathode-ray tube to become unintelligible in view of the fact that the video scrambling relay, as previously indicated, opens up the sync signal circuit. In the absence of horizontal and vertical sync, the picture presented is scrambled.

When pricing pulses cease, relay 102 opens. Its contact 2, however, closes when the relay ceases operation. This shunts the contacts 1 of relay 101 which by now have opened and thus the coin slot solenoid 211 remains open.

In summary of what has occurred, the long pulse in the B control tone serves to initiate operation of the apparatus whereby pricing pulses can be conveyed to the indicator in the coin box. When the price is racked up, a cam switch in the coin box is operated to close the video scrambling relay in the subscriber's television set, a door underneath the slot in the coin box where coins are deposited is opened so that the coin demand or price may be satisfied, and the relay circuitry is set up so that subsequent recurrence of transmission of the price information will not serve to further operate the price wheel in the coin box. The video scrambling relay 88 is shown having its normally closed contacts connecting the source of composite video signals in the subscriber's receiver to the grid of a sync amplifier tube 130. Opening of the contacts prevents sync signals from reaching the subsequent sync separator and ensuing circuitry. It will be appreciated that this relay, if desired, may have its contacts inserted in the plate circuit or cathode circuit as well as the grid circuit of any of the tubes in the sync separator chain so that when the relay is operated there is no sync delivered to the deflection coils of the picture tube. The showing herein of the grid circuit contact insertion is by way of example and is not to be taken as a limitation. It should also be appreciated that this video scrambling relay may also be positioned and properly operated in the circuitry of the embodiment of the invention shown in Figure 2.

*Paying for the program.*—There are two solenoids used in payment: One racks up 5-and-10-cent payments and is the same U solenoid 200 as is used for establishing price, and the other is a 25-and-50-cent solenoid 213 designated as V. These, of course, are in the coin box. The 5-and-10-cent solenoid is actuated by a coin-contact switch 201, once for 5¢ and twice for 10¢. The 25-and-50-cent solenoid is actuated by another coin-contact switch 202, once for 25¢ and twice for 50¢. Switch 201 is a micro-switch which is normally open. On depositing a 5¢ coin in the coin box, the switch closes once, applying one pulse to the solenoid U; and, on depositing 10¢, the switch closes twice, closing power connections twice to the solenoid U. Switch 202 is a micro-switch which is normally open. On depositing 25¢, it operates to apply power once to solenoid V, and, on depositing 50¢, it operates to apply power twice to solenoid V. These solenoids pull a pricing wheel shown in Figure 7 around to the paid position. The details of the solenoids and pricing wheel operation will be described and shown in more detail in connection with the description of Figures 7 through 10.

The circuit through the U solenoid can be traced from the 150-volt unregulated potential source in Figure 5 through normally closed contacts 3 of the relay 104 through pin 20 in the plug and jack through the solenoid U through switch 201 to ground by way of pin 1 in the plug and jack. The circuit through the V solenoid can be traced from the 150-volt source of potential shown in Figure 5 through pin 23 in the plug and jack down through a tilt switch 214 through switch 202 through solenoid V to pin 1 in the plug and jack and then to ground. The purpose of the tilt switch 214 is so that when a 25¢ coin, for example, is deposited, the coin box cannot be tilted to actuate the 50¢ solenoid since actuation of the tilt switch will prevent registration of the deposited coin.

When sufficient coinage is deposited, the pricing wheel shown in Figure 7 reaches a paid position; switch 209 is operated by a cam on the pricing wheel when it reaches the paid position. In its operated position, switch 209 serves to render inoperative the video scrambling relay 88 and the coin slot solenoid 211. Thus, the scrambling relay is no longer operated, the video picture becomes intelligible, and the door under the coin slot closes so that no more coins can be deposited. Switch 209 closes the circuit from pin 23 and the 150-volt power supply to pin 8. This serves to actuate relay 107, which can be designated as the "paid-up" relay. The number 2 contacts of relay 107 are connected as shown for the audio relay 62 in Figures 2 and 3 so that, when the relay is actuated, it switches from the FM detector in the subscriber's receiver to the FM detector in the electronic unit, thereby applying the program sound in place of the barker sound. The normally closed number 4 contacts of relay 107 are opened when the relay operates. This opens the circuit from the number 2 contacts of relay 102 through the number 3 contacts of relay 106 which was made with the pricing solenoid U. Therefore, any subsequent operation of either relays 101 or 102 cannot apply price pulses to the pricing solenoid.

In summary, upon paying for a program by depositing the required coinage, a pricing wheel is driven around to the paid position. A cam-operated switch 209 inactivates the video scrambling relay and a coin slot solenoid 211 which closes a door in the coin box covering the coin slot. It also actuates a paid-up relay. This switches the audio circuits from the FM detector in the subscriber's receiver to the FM detector in the electronic unit; thereby, the audio which accompanies the paid program can be heard by the subscriber. Further, the operation of the paid-up relay prevents any subsequent pricing pulses from affecting the pricing wheel in the coin box.

*Recording the program identification code.*—When relay 107 is operated, its number 5 contacts complete a circuit to ground on one side. The other side of these contacts go to the number 1 contacts of relay 106 and thence to the relay coil of relay 101, the other side of which is connected to a source of operating potential. As shown, when relay 106 operates on the next 400 millisecond pulse, its number 1 contacts will operate relay 101. Operation of relay 101 closes to ground through the number 3 contacts of the relay, the following: (1) a circuit through the number 3 contacts of relay 107, pin 5 in the plug and jack, and (2) a switch 206, a tape-recorder motor 215, pin 9 in the plug and jack and back to the alternating current voltage supply. Accordingly, the recording motor starts to turn. The recording motor and its associated cam-operated switch 205, 206, 207 are located in the coin box and are shown in more detail in Figure 11. In the description of the operation of cam switches 205, 206, and 207 that follows, reference will also be made to Figure 6A which shows the switch action over one cycle of operation. Shortly after the end of the 400 millisecond B pulse, relay 101 opens. However, in this interval, shown as 1—2 in Figure 6A, the motor has turned far enough so that cam switch 207 is closed. In the closed position, switch 207 completes a circuit from ground through switch 206 through the motor to pin 9 on the jack to the source of alternating current. Thus, the motor continues to turn. One thousand milliseconds after the B pulse has terminated, the recording pulses or program identification pulses begin to occur. This can be readily seen by reference to Figure 4. Relay 106 closes for each B pulse. Contact 2 on relay 106 completes a circuit from one of the secondaries of the transformer in the power supply to pin 18 of the plug and jack and then through a current-limiting resistor 216 to a magnetic recording head 217, identified as PU, and then to ground. Contacts 2 of relay 106 are normally closed so that 60 cycles A.C. can reach the recording head continuously except when relay 106 is actuated. Since relay 106 is actuated by the B recording pulses, this serves to interrupt or pulse the 60 cycles being applied. As the motor turns, therefore, the B recording pulses serve to key relay 106, which in turn keys the 60 cycles so that a corresponding record is made by the pickup head PU on the magnetic tape being moved by the motor.

Referring now to the switch sequence diagram shown in Figure 6A as shown, switch 207 is operated at time or position 2 and is maintained operated until the cam on the motor reaches position 6, at which time it opens. Switch 206 operates when the cam reaches position 4, and remains operated until position 8. Switch 205 operates when the came reaches position 3, and remains operated until position 7. When the recorder motor cam has reached position 3, as shown on the switch diagram, switch 205 is operated. This serves to shunt the A.C. coming through pin 18 to the limiting resistor 216 and magnetic recording head 217 to ground through the now-operated switch 205 and through pin 1 of the jack. Therefore, no recording occurs on the magnetic tape when switch 205 operates, leaving a blank space before the motor ceases to operate.

When switch 205 moves to its operated position, it also opens the circuit which shunts the cathode resistor 122 of the two amplifier tubes 113, 116. This circuit can be traced through pin 11 to the cathodes which were connected to ground by switch 205 when it was in its nonoperated position. This prevents A and B pulses from coming through these tubes to key relays 102 and 106. Furthermore, this prevents further price and program identification pulses from affecting the system. At position 4 on the switch sequence diagram, switch 206 commences operation. In its operated position, switch 206 opens the ground connection and thus prevents A.C. from going to the motor. This stops the recording motor. The cam is approximately in position 5 shown on the switch-sequencing diagram when this occurs.

In summary, the operation of the system is as follows: When the paid-up relay 107 closes, it permits relay 101 to close, which, in turn, permits the recording motor to turn. By means of cam-operated switches, the motor is permitted to turn and relay 102 pulses in accordance with the program identification control tones. These control tones are recorded in the form of keyed 60-cycle pulses on the magnetic tape in the coin box. When the motor has turned a sufficient distance to insure complete recording, cam-operated switches cause the motor to cease its operation.

*Voting.*—It will be noted that there is a voting button 80 on top of the coin box shown in Figure 3. It operates in the following manner: Pressing the voting button closes the switch 204 shown in Figure 6. A.C. goes from pin 9 through the motor, through switch 206, through switch 204, through a voting light 218 to ground. The motor then turns its associated cam from position 5 to position 6 on the switch-sequence diagram. At position 6, switch 207 is opened again. However, it should be noted that both switches 205 and 206 are still operated. The voting button is held until at position 7 switch 205 is restored to its standby condition. This again shorts out the common cathode resistor of the two amplifier tubes 114 and 115 through pin 11, switch 205 and pin 1 of the plug and jack. Also, A.C. is applied to the pickup head 217 again. At position 8 on the switch-sequence diagram, switch 206 goes to its standby position. In this position the supply of power to the motor through pin 9 is interrupted and by the time the motor stops it is back to its starting position just as it was before the recording cycle began.

It should be noted that when the voting button was pressed it served to move the motor. Power was restored to the recording head. With the next occurrence of the B pulse train, the system will record whatever information is desired, i.e., voting identification data, which is being transmitted on the B pulse train. If the voting button were not pressed, the system would remain at position 5 and would thus be locked out against any voting information being transmitted on the B pulse train.

Connected in series in the circuit which shorts out the high-value resistance 122 is a broken tape switch 210 (shown on Figure 6). This comprises a switch which is closed as long as the tape remains unbroken. When the tape breaks the switch is opened, and, accordingly, the high-value resistor is not shunted out. The tubes involved are cut off. This permits relay 104 to become inoperative, and the control unit, accordingly, cannot be operated. The broken tape switch may be, by way of example, a micro-switch which is maintained closed by the pressure of the tape itself which extends between the tape pickup and feed reels.

*Resetting.*—A resetting solenoid 220, designated as T, is located between pin 21, switch 208, and ground. From pin 21 the circuit may be traced through normally closed contacts 3 of relay 104, the holding relay, to a 150-volt source of potential. When the holding relay 104 becomes inoperative as a result of an interruption of the control tones, such as is occasioned by an end of the program or by turning off the channel of the television set, the circuit is completed to the release solenoid energizing the release solenoid. This operates to turn the pricing wheel to its blank or starting position. When the pricing wheel reaches its blank position, switch 208 moves to its nonoperated position, thereby opening up the path of the release solenoid to ground. Thereby the release solenoid ceases to be energized. When relay 104 is rendered inoperative, a circuit to ground is made for the recording motor which is still at position 5 (no vote). This can be traced through operated switch 206, pin 16, and the number 1 contacts of relay 104. Thus the motor is energized until it returns to the starting position when switch 206 is returned to its standby condition, thus cutting off power. Two neon lights shown in Figure 6 serve the purpose of indicating that a price has been established in the coin box. They are turned on as soon as switch 208 is operated.

Figures 7 through 10 show the details of the pricing mechanism and coin demand satisfaction mechanism in the coin box. The apparatus to be described is electromagnetically operated by various pulses in the manner described for Figures 5 and 6.

The apparatus includes, generally, a single-stepper electromagnet 300, a five-stepper electromagnet 301, and a release magnet 302. These respectively correspond to the U, V, and T solenoids 200, 202, and 220 shown in Figure 6. Energization of either one of the two magnets 300, 301 causes clockwise rotation of the ratchet wheel 304 which has a co-operating pawl member 305. The ratchet wheel 304 is stepped around an angular distance corresponding to one tooth on the ratchet wheel 304 each time the single-stepper electromagnet 300 is energized, and the ratchet wheel 304 is stepped around an angular distance corresponding to five teeth when the five-stepper electromagnet 301 is energized. The release magnet 302, when energized, serves to allow the ratchet wheel 304 to rotate in a counterclockwise direction to its normal position, illustrated in Figure 7, wherein switch 208 and switch 209 are in their standby positions. Figure 7 thus represents one extreme end of travel of the ratchet wheel 304, and the other end of travel of the ratchet wheel 304 corresponds to the condition wherein the cam member 306 is in a position wherein it causes operation of switch 209. The cam member 306, of course, rotates with the ratchet wheel 304 and allows the switch 208 to be operated upon the first energization of the single-stepper electromagnet 300.

The first energization of the electromagnet 300, as previously mentioned, causes the movement of the ratchet wheel 304 an angular distance corresponding to one tooth and causes operation of switch 208 since the cam member 306 is moved, and, further, it causes movement of the price wheel 310 an angular distance corresponding to 5¢ so that at this time the printed numeral $2.00 appears visible through the window 82 (Figure 3) in the casing 313. Each successive pulse supplied to the electromagnet 300 causes the price wheel 310 to move another angular distance corresponding to 5¢. Sufficient coin demand pulses are transmitted so that the price wheel 310 is rotated a sufficient amount that the coin demand, after cessation of the pulses, appears visible in printed form through the aperture 82. Thus, assuming that a program has a value of $1.95, two pulses are transmitted; when the program has a value of $1.00, 101 coin demand pulses are transmitted; and so on, so that in the first instance the numeral $1.95 is visible, and in the second instance $1.00 is visible. The coin demand is met by depositing coins in a coin box so arranged that the insertion of a 5¢ piece causes one pulse to be transmitted to the electromagnet 300, a 10¢ piece causes two pulses applied to the electromagnet 300, a 25¢ piece causes one pulse to be applied to the electromagnet 301, and a 50¢ piece causes two pulses to be applied to the electromagnet 301. The mechanical interlinkage, as described later, between electromagnet 300 and pawl 305 causes the ratchet wheel 304 to rotate one tooth per pulse applied to electromagnet 300, and causes the ratchet wheel 304 to be rotated five teeth per pulse applied to electromagnet 301. It is noted that the transmitted and received coin-demand pulses cause the same clockwise rotation of the ratchet wheel 304 as do the coin-caused pulses which are applied as a result of insertion of the coins. Thus, in order to meet the above-mentioned coin demand of $1.95 and $1.00, in either case the coin wheel 301 is required to be rotated to a position where "paid" is visible through the window 312, in which case the cam 306 causes operation of switch 209 to condition and energize electrical circuits as described previously.

*Pricing.*—A backing plate 325 has its lower edge turned inwardly, as shown in Figure 7, to provide a leg 325A suitably apertured to support the solenoids 300A, 301A, and 302A of electromagnet 300, 301, and 302, respectively, and also such leg 325A serves as a support for the adjustable spring tension adjusting bolt 320.

As shown in Figure 8, the backing plate 325 supports an elongated bearing member 331 within which is journaled the rotatable shaft 332. This bearing member 331 comprises a threaded sleeve with a nut 333 threaded thereon so as to clamp the spring housing 334 between the backing plate 325 and the bearing sleeve 331. Another bearing is provided for the rotatable shaft 332, and such bearing includes a bushing 340 which is press fitted in a circular aperture of the front plate 341, such front plate 341 being fixed in spaced relationship to the backing plate 325 by threaded sleeves 342 and fastening bolts 343.

The shaft 334, thus rotatably mounted, has mounted thereon the following elements: the disc 345 of insulating material and ratchet wheel 304. The aforementioned bushing 340 is sufficiently prolonged to provide a spindle for pivotally supporting the lever 350, which, in turn, has pivotally mounted thereon a pawl member 305, the pawl member 305 being pivoted on the pivot pin 355 around which is wound a torque spring 356. One end of the torque spring 356 engages the lever 350 and the other end of the torque spring 356 passes through an apertured portion of the pawl member 305 to bias such pawl member 305 upwardly into cooperating engagement with the ratchet wheel 304. The pawl member 305 has an extended portion 305A which passes through an apertured window 358 of the plate 359 mounted on the armature 360 of the release electromagnet 302, whereby, upon energization of the release electromagnet 302, the pawl member 305 is withdrawn from out of engagement with the ratchet wheel 304 to thereby allow such ratchet wheel 304 to rotate in a counterclockwise direction under the influence of the torque spring 370 (Figure 8) which has one of its ends affixed to the housing 334 and the other one of its ends passing through an apertured portion of the disc 345. Normally the aforementioned armature 360 is biased upwardly (Figure 9) by the coil compression spring 372 to thereby press the beveled upper edge of the plate 359 into locking engagement with the ratchet wheel 304. Thus, when the magnet 302 is energized, not only is the pawl member 305 moved downwardly but the pawl is also moved out of locking engagement.

The five-stepper electromagent 301 has its armature 380 pivotally connected to one arm of the lever 350 by means of the pivoted link 382. The armature 380 is maintained in its raised position, as shown in Figure 7, by the elongated coil-tension spring 385, having one of its ends affixed to the adjustable bolt 320 and the other one of its ends attached to the lever 350.

When the five-stepper electromagnet 301 is energized, the lever 350 is rotated, carrying with it the pawl 305, and this movement continues until the projection 305A (Figure 10) on the pawl engages the stationary post 386, at which time the ratchet wheel 304 is rotated an angular distance corresponding to five teeth. During the aforementioned movement of lever 350, the shoulder-retaining screw 388 is allowed to move within the lost-motion slot 389 in the link member 390. The link member 390 has its lower end, as shown in Figure 10, pivotally connected to the armature 391 of the single-stepper electromagnet 300. The coil-tension spring 392, having one of its ends affixed to the stationary front plate 341 and the other one of its ends affixed to the link 390, serves to maintain the armature 391 in its fixed position. However, when the electromagnet 300 is energized, the armature 391 is withdrawn and the lever 350 is rotated clockwise an angular distance of approximately one tooth to advance the ratchet wheel an angular distance corresponding to one tooth. In order to assure movement of the ratchet wheel 304 an angular distance of only one tooth, the locking bar 394 (Figure 10) is provided. Such locking bar 394 is pivotally supported for pivotal movement about the axis of the pivot pin 396, and the left-hand free end thereof is beveled to coact with the teeth of the ratchet wheel 304. The other right-hand end of the bar 394 has an enlarged aperture 394A therein through which the pin 390B, carried by the link 390, passes, so that, whenever the electromagnet 300 is energized as illustrated in Figure 10, the bar 394 is moved into locking engagement with the ratchet wheel 304 to assure rotation of the ratchet wheel an angular distance corresponding to one tooth.

The switch 209 is conventional in construction and is affixed as a unit by conventional means to the back plate 325 with the arm 394 (Figure 7) in the path of movement of the cam 306, the cam 306 being affixed to the disc 345 of insulating material. As mentioned previously, the switch 209 is operated only after a coincident condition has been achieved, i.e., the required coinage has been deposited to cause a reading of "paid" at the window 82 (Figure 3). Likewise, switch 208 is of conventional construction and is mounted as a unit on the backing plate 325 with the actuating member 397 thereof in the path of movement of the cam member 306.

Figure 11 is a rear view in section of the coin box showing the location of apparatus such as fuses and terminals. In addition, there are shown the pay-out and take-up reels 400, 402 for the magnetic tape. The magnetic tape, as is customary, is fed from the pay-out to the take-up reel. The writing head 217 is positioned to be in contact with the tape (not shown). A cam 404 is shown which is rotated when the tape-drive motor 215 is driven to time the operation of the three microswitches 205, 206, and 207. These are in position over said cam. The voting button 80 can be seen in this view also.

Accordingly, there has been shown and described herein a system which is employed in subscription television which permits the normal and unscrambled transmission on land lines of programs for which payment is to be made. The receiver of a subscriber will receive signals which precede and accompany the program and, by means of the invention shown herein, will scramble these signals so that the picture is unintelligible. Means are shown for presenting a price or coin demand, the satisfaction of which enables an intelligible picture to be presented and the program sound to be received. The mechanism for scrambling a program until price demand has been met is more simple and inexpensive than that for any systems previously shown.

I claim:

1. In a subscription television system wherein programs are distributed to subscriber receivers from a transmitter by wire, means to transmit tone signals and program signals including video signals and audio signals from said transmitter to each subscriber receiver, coin demand means at each of said receivers responsive to certain ones of said tone signals to indicate a coin demand, means to apply received tone signals to said coin demand means, means at each of said receivers responsive to others of said tone signals to spoil said video signals, means to apply received tone signals to said means to spoil said video signals, means at each receiver for satisfying said indicated coin demand and for providing an output indicative thereof and means responsive to said output indicative of satisfaction of said coin demand to inactivate said spoiling means to permit a subscriber to view and hear said program.

2. In a subscription television system wherein programs are distributed to subscriber receivers from a transmitter by wire means to transmit program signals and tone signals from said transmitter to each subscriber receiver, coin demand means at each of said receivers responsive to certain ones of said tone signals to indicate a coin demand, means to apply said received tone signals to said coin demand means, means at each of said receivers responsive to said tone signals to spoil said program signals, means to apply received tone signals to said mains to spoil said video signals, means at each receiver for satisfying said indicated coin demand and for providing an output indicative thereof, and means responsive to said output indicative of satisfaction of said coin demand to inactivate said spoiling means to permit a subscriber to view said program.

3. In a subscription television system wherein programs are distributed to subscriber television receivers from a transmitter by wire, means to transmit to each receiver program video signals, program and price identification sound signals, control tone signals and program sound signals, a first sound channel at each receiver for detecting said program and price identification sound, a second sound channel at each receiver for detecting said program sound and said control tone signals, audio signal reproducing means at each receiver, means at each receiver connected to said second sound channel and responsive to certain ones of said control tone signals to indicate a coin demand, means to apply said certain ones of said received control tone signals to said means to indicate a coin demand, means at each receiver to receive said video signals, means at each receiver connected to said sound channel and operative responsive to other ones of said control tones to spoil said received video signals, means to apply said other ones of said received control tone signals to said means to spoil said received video signals, relay means at each receiver to apply when not operated the output of said first sound channel to said audio signal reproducing means and when operated to apply the output of said second sound channel to said audio signal reproducing means, and means responsive to a payment of said coin demand to inactivate said spoiling means and to operate said relay means to permit said program to be seen and heard.

4. In a subscription television system of the type wherein a transmitted program distributed by wire may be viewed on the television receivers of subscribers only after payment for same has been made, apparatus for spoiling the video portion of said program until after coin payment comprising means at said receiver including a relay to spoil the video picture when operated, means to transmit control signals from said transmitter, means responsive to control signals from said transmitter to operate said relay to spoil said picture, means at said receiver for receiving payment for a program and for providing an output indicative thereof, and means at said receiver responsive to said output indicative of payment for a program to render said means to spoil said picture inoperative.

5. In a subscription television system of the type wherein a transmitted program is distributed by wire and may be viewed on the television receivers of subscribers only after payment for same has been made, apparatus for spoiling the video portion of said program until after the required payment comprising means at said subscriber receiver to interrupt the television signal being received on said receiver at a rate which is high when compared with audio frequency, means at said subscriber receiver for receiving payment for a program and for providing an output indicative thereof, and means to disable said means to interrupt responsive to said output indicative of payment for a program.

6. In a subscription television system of the type wherein a program being transmitted by wire may be viewed on the television receivers of a subscriber only after coin payment for same has been made, apparatus for scrambling said program until after said coin payment comprising a video noise signal source at the receiver of said subscriber, means to couple said noise source to an input stage of said receiver, and means to uncouple said noise source from said subscriber's receiver upon payment for a program desired to be viewed.

7. In a subscription television system of the type wherein a transmitted program is distributed by wire and may be viewed on the television receiver of a subscriber only after coin payment for same has been made, said television receiver including apparatus at a subscriber's receiver for spoiling the video portion of said program until after coin payment for same has been made, comprising an oscillation generator, an amplifier having an input and an output, means to couple said oscillation generator output to said amplifier input, a relay having normally closed and normally open contacts, means to connect normally closed contacts between said program wire and said receiver input, means to connect said normally open contacts between said amplifier output and said receiver input, means to connect said program wire to said receiver input, and means to operate said relay until coin payment for a program has been made.

8. Apparatus for coding as recited in claim 7 wherein said oscillation generator generates square wave signals at a rate which exceeds 30 kilocycles per second.

9. Apparatus for coding as recited in claim 7 wherein said oscillation generator generates saw-tooth wave signals at a rate which exceeds 30 kilocycles per second.

10. In a subscription television system of the type wherein a transmitted program distributed by wire may be viewed on the television receivers of subscribers only after payment for same has been made, apparatus for spoiling the video portion of said program until after coin payment comprising means to transmit control signals from said transmitter, means at each receiver including relays responsive to said control signals from said transmitter to spoil the video picture, means at each receiver for receiving payment for a program and for providing an output indicative thereof, and means at each receiver responsive to said output indicative of payment for a program by a subscriber to render said means to spoil said picture inoperative.

11. In a subscription television system of the type wherein a transmitted program being distributed by wire may be viewed on the television receiver of a subscriber only after coin payment has been made, said receiver including synchronizing signal circuits, apparatus for scrambling said program comprising means to apply operating signals to said synchronizing signal circuits, relay means responsive to control signals from said transmitter to interrupt the application of operating signals from said means, means to apply said control signals to said relay means, means for receiving payment for a program and providing an output indicative thereof, and means at said receiver responsive to said output indicative of payment for a program to render said relay means inoperative.

12. In a subscription television system of the type wherein a transmitted program being distributed by wire may be viewed on the television receiver of a subscriber only after coin payment has been made, said receiver including synchronizing signal circuits, apparatus for scrambling said program comprising a relay having a solenoid coil and a pair of normally closed contacts, means to apply operating potential to said synchronizing signal circuits through said pair of normally closed contacts, means at said transmitter to generate control signals, means responsive to control signals from said transmitter to apply current to said relay solenoid coil to open said pair of normally closed contacts, means to apply said control signals to said means responsive to control signals, means for receiving payment for a program and providing an output indicative thereof, and means at said receiver responsive to said output indicative of payment for a program to interrupt the current applied to such relay coil.

13. In a subscription television system wherein programs are distributed to subscriber television receivers from a transmitter by wire, means to transmit program signals including tone signals from said transmitter to each subscriber receiver, coin demand means at each of said receivers responsive to certain ones of said tone signals to indicate a coin demand, means to apply said tone signals to said coin demand means, a synchronizing signal separator tube at each receiver, means to apply operating potential to said synchronizing separator tube including a relay, means at each receiver responsive to others of said tone signals to operate said relay to interrupt the application of operating potential to said synchronizing separator tube, means to apply said tone signals to said last named means, means at each receiver to receive payment of said coin demand and to provide an output indicative thereof, and means at each receiver responsive to said signal indicative of payment of said coin demand to render said relay means inoperative to apply operating potential to said synchronizing separator tube to permit viewing of said program signals.

14. In a subscription television system wherein programs are distributed to subscriber television receivers from a transmitter by wire, means to transmit program signals including tone signals to each subscriber receiver, coin demand means at each of said receivers responsive to said certain ones of tone signals to indicate a coin demand, means to apply said tone signals to said coin demand means, means to generate video noise signals at each receiver, means at each receiver to apply said video noise signals to the input to said receiver to spoil the video portion of said program responsive to said tone signals, means at each receiver to satisfy said indicated coin demand and to provide an output indicative thereof, and means to prevent application of said video noise signals to said receiver responsive to said output indicative of a satisfaction of said coin demand.

15. In a subscription television system wherein programs are distributed to subscriber television receivers from a transmitter by wire, means to transmit to each receiver program video signals, program and price identification sound signals, control tone signals and program sound signals, a first sound channel at each receiver for detecting said program and price identification sound, a second sound channel at each receiver for detecting said program sound and said control tone signals, audio signal reproducing means at each receiver, synchronizing signal circuits at each receiver, a source of synchronizing signals, first relay means to apply when not operated, synchronizing signals from said source to said synchronizing circuits, second relay means to connect the output of said first sound channel to said audio signal reproducing means in a nonoperated position and to connect the output of said second sound channel to said audio signal reproducing means in an operated position, means at each receiver to which price identification signals are applied from said first sound channel to indicate a coin demand responsive to said price identification signals, means at each receiver to which said control tone signals are applied from said second sound channel to operate said first relay means to prevent synchronizing signals from said source from reaching said synchronizing circuits, means to satisfy said indicated coin demand and to provide an output indicative thereof, and means responsive to said output indicative of a satisfaction of said coin demand to render said first relay means inoperative and to operate said second relay means to provide an intelligible program picture and sound for said subscriber receiver.

16. In a subscription television system as recited in claim 15 wherein said first relay means includes a relay having a pair of normally closed contacts and said synchronizing signal circuits include a vacuum tube having a control grid, and there are means coupling said source of synchronizing signals to said control grid through said normally closed contacts.

References Cited in the file of this patent

UNITED STATES PATENTS

| | | |
|---|---|---|
| 2,463,502 | Atkins | Mar. 8, 1949 |
| 2,755,333 | Druz | July 17, 1956 |
| 2,769,026 | Gottfried et al. | Oct. 30, 1956 |

FOREIGN PATENTS

| | | |
|---|---|---|
| 696,584 | Great Britain | Sept. 2, 1953 |